July 18, 1944.   E. W. LAGER   2,353,909
TRUCK REFRIGERATION
Filed Sept. 30, 1940   2 Sheets-Sheet 2

Eric W. Lager
INVENTOR

ATTEST -

BY R. H. Story
ATTORNEY

Patented July 18, 1944

2,353,909

UNITED STATES PATENT OFFICE 2,353,909

TRUCK REFRIGERATION

Eric W. Lager, Chicago, Ill., assignor to Industrial Patents Corporation, Chicago, Ill., a corporation of Delaware Application September 30, 1940, Serial No. 358,943

8 Claims. (Cl. 62—24)

This invention relates to an improved method of and device for refrigerating motor trucks, railway cars, and like vehicles.

One of the objects of the invention is to provide an improved method of vehicle refrigeration whereby refrigerating temperatures can be uniformly maintained around product loaded in various sections of the vehicle body.

Another object of the invention is to provide an improved air chilling device for motor trucks, railway cars, and similar vehicles.

Another object of the invention is to provide a method and means for maintaining a refrigerating temperature in various portions of a vehicle body while the other portions are not under refrigeration.

A further object of the invention is to provide a truck refrigeration unit embodying an improved air cooling system.

A still further object of the invention is to provide an improved method of dividing a motor truck or railway car into a plurality of compartments and refrigerating such compartments as may be desired.

Another object of the invention is to provide a means for maintaining product in a motor truck or railway car under constant and uniform refrigeration while the vehicle is being intermittently opened for unloading.

Other objects of the invention will be apparent from the description and claims which follow.

The refrigeration unit of the present invention is adapted for use in enclosures of all types, such as rooms, railway cars, automobile truck bodies, and automobile trailers. By way of illustration, but without limiting the scope of the invention, the refrigeration unit will be described as used in the body of an automobile trailer.

Shippers of perishable products, such as meat, vegetables, fruits, and dairy products have for many years struggled with the problem of maintaining product under refrigeration during shipment. The development of the refrigerated railroad car, and more recently the refrigerated motor truck, is well known. In the case of motor trucks the problem has been particularly acute due to the necessity for compactness of the refrigeration unit in order to conserve space and weight, as the size and weight of truck bodies is limited by law of most states. The preferred system of refrigeration will require, therefore, that it be compact and of little weight for the amount of refrigeration secured. The desired refrigeration unit necessarily must be highly efficient so as to require as small an amount of refrigerant as possible. The present invention involves a device which is somewhat larger than that shown in my Patent No. 2,202,954 entitled "Refrigeration unit," issued June 4, 1940, but is much more highly efficient and therefore results in increased savings in produce, in ice, and in time spent in charging the device with ice.

Another pressing problem of the shippers of perishable products is the shipment of many items to a plurality of consignees, in many cases extending over considerable territory. It is not uncommon for a truck loaded with perishable product to contain orders for many consignees, perhaps fifty or more, which are scattered over a territory sufficiently large to require many hours to deliver all of the shipments. It is self-evident that with each opening of the doors of the refrigerated truck for delivery of each consignment the cooled air in the truck is permitted to escape so that after a few stops the temperature within the truck will have risen twenty or thirty degrees. In effect this deprives the product to be last delivered from effective refrigeration for a considerable period of time, as well as being expensive in the use of refrigerant while endeavoring to maintain satisfactory temperatures. The present invention, in addition to providing an improved refrigeration unit, provides a practical means of dividing a truck body into a series of transverse compartments, each of which is comparatively tightly sealed from the one adjoining, and each of which is supplied with sufficient chilled air to maintain the desired temperature. In actual practice it has been found that the method of truck refrigeration disclosed herein provides sufficient refrigeration throughout each portion of the truck as may be loaded with product, even though other sections of the truck are opened for delivery of product, and preserves the refrigerating temperatures in the various compartments, other than the one opened, at a relatively low and stable figure. In actual practice it has been found that there may be as much as thirty degrees Fahrenheit difference in the atmosphere of two adjoining compartments, one of which had been opened to permit the removal of product.

Briefly, the present invention provides an improved refrigeration unit embodying an air cooling system in which the air is more thoroughly chilled than heretofore possible and de-humidified before leaving the apparatus; an air duct leading from the refrigeration unit to the various sections or compartments of the truck; transverse compartments within the truck formed by means of heavy duck or other suitable curtains extending from wall to wall and from substantially adjacent to the ceiling to the floor, which curtains are of sufficient length to permit a considerable portion to lie upon the floor to form an effective seal between adjacent compartments; means for forcing the air through the refrigeration unit and the air duct; and valve means which can be operated from outside the truck to permit or stop the flow of chilled air from the duct into the respective compartments.

These various elements are necessary in order to maintain the desired temperatures throughout the truck, and particularly in the compartments other than the one opened for unloading.

The present invention overcomes the defects of prior devices and methods of truck refrigeration and provides highly efficient cooling of the air within the truck through a relatively light and compact refrigeration unit which carries a relatively smaller charge of refrigerating medium, such as ice, than has heretofore been possible for equivalent temperature control. The present invention also provides light-weight and extremely flexible means for dividing the truck into a plurality of compartments, each of which is quite effectively sealed from the other, and means for conducting the chilled air from the refrigerating unit to each of the compartments at will.

The present air chilling unit comprises an ice bunker with a slit in the bottom thereof to permit melted ice to drain therefrom in the form of a sheet, a larger chamber surrounding the bunker to provide a brine storage tank below the bunker and air passages at each end and below the bunker, sprays within the bunker and within at least one of the air passages to spray chilled brine upon the ice within the bunker and upon the air passing through the air passages, a pump for pumping brine from the brine tank to the sprays, an air fan to force air through the system, and a motor to drive the fan and pumps. Preferably the entire device other than the motor, which should be located outside of the trailer body, is located adjacent one wall of the trailer body, such as the front end thereof. Leading from the refrigeration unit is an air duct provided with a plurality of outlets or louvers and a damper adjacent each wall dividing the respective compartments from each other. The air duct leads from the refrigeration unit to the furthermost compartment removed therefrom. The compartments are formed by heavy duck or other fabric curtains, which form a partition, substantially impervious to the passage of air therethrough, from wall to wall and from the floor to substantially adjacent the ceiling. For each partition I prefer a pair of such curtains slidably mounted on an iron bar adjacent to the ceiling, and with the outer edges tightly secured to the walls of the trailer body, the curtains being of sufficient width to overlap in the center to form a relatively air-tight seal at that point, and of length somewhat greater than the height of the body so as to permit several inches to lie upon the floor to form an air-tight seal along the floor.

A preferred embodiment of the present invention is shown in the accompanying drawings which form a part of this specification and in which like reference characters in the several figures designate similar elements.

Figures 1, 2:
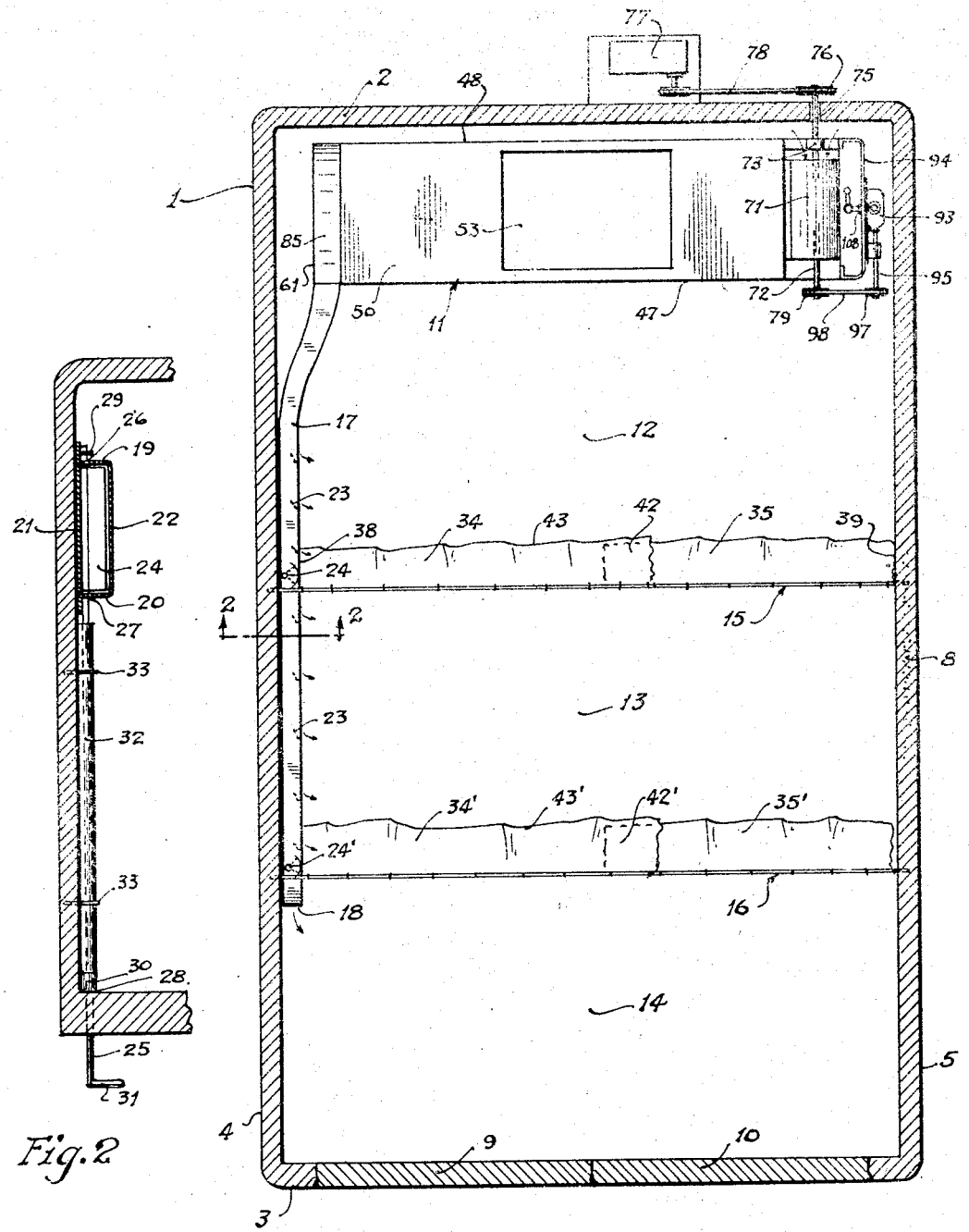
Figure 1 is a plan view of a trailer body, showing the location of the refrigeration unit, the duct extending therefrom and the compartments into which the trailer body is divided.
Figure 2 is a cross-sectional view of the air duct along the line 2—2 of Figure 1, showing the means of operating the damper in the air duct.
Figure 3:
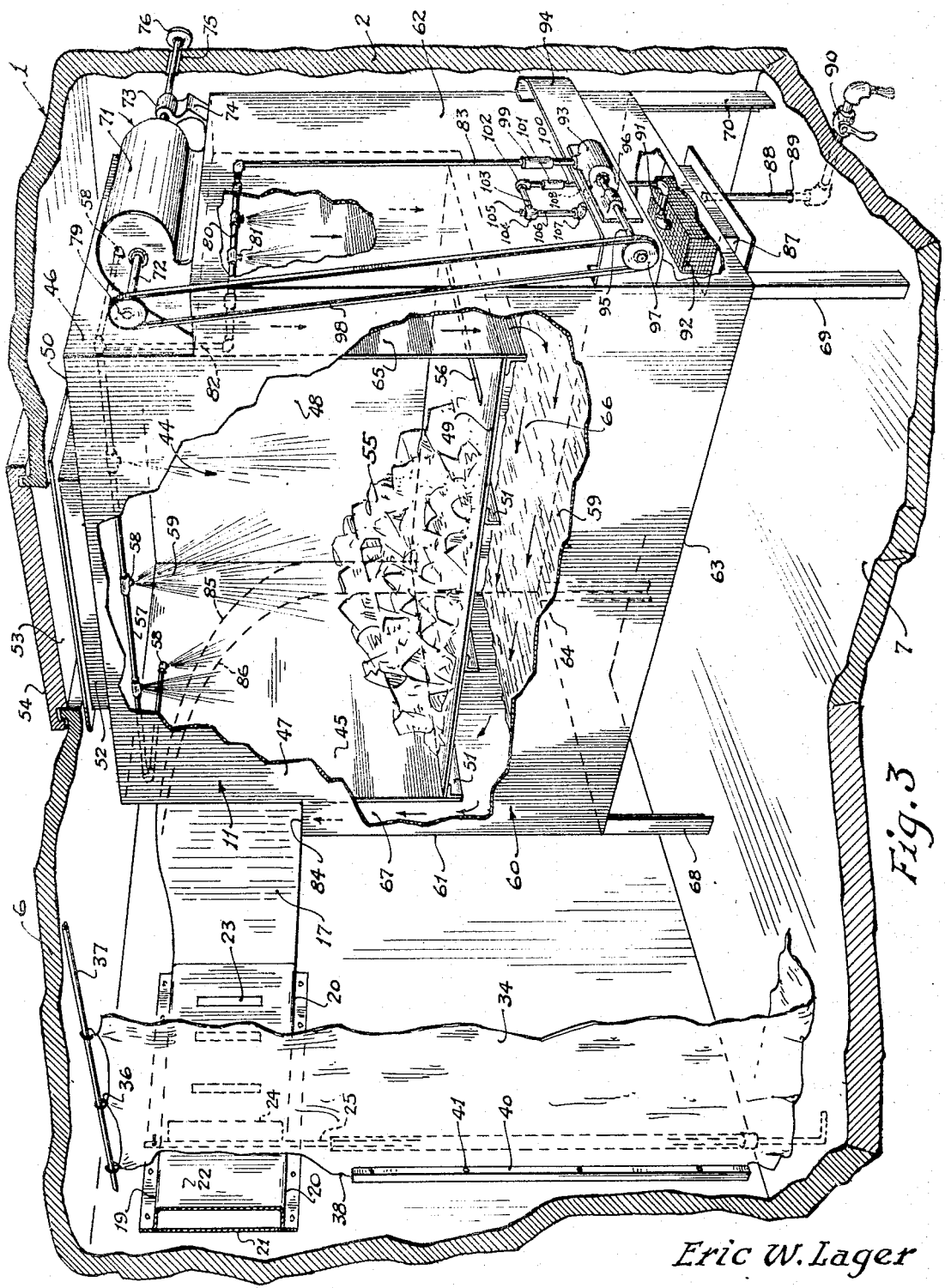
Figure 3 is an enlarged perspective view of the refrigeration unit for chilling the air within the truck.

Figure 1 discloses the present invention as applied to an ordinary automobile trailer body 1. The trailer body 1 comprises front end wall 2, rear end wall 3, side walls 4 and 5, and as shown in Figure 3, top or ceiling 6 and bottom or floor 7. Preferably, the walls, floor and ceiling are of double construction and will be filled with suitable insulating material 8. Access to the truck body is secured through tightly fitting doors 9 and 10 in the rear end wall 3. The air chilling unit 11 is placed as close to the front end wall 2 as possible.

The trailer body 1 is divided into a series of compartments, such as compartment 12 adjacent to the front end of the truck, compartment 13 intermediate the ends thereof, and compartment 14 at the rear end of the trailer body 1, by means of partitions 15 and 16, respectively. An air conduit 17 adjacent the ceiling 6 of the trailer leads from the air chilling unit 11 rearwardly along the adjacent side wall 4 through the intermediate compartments 12 and 13 and into compartment 14, terminating at 18.

It is preferred that the duct be of rectilinear shape with its vertical axis much longer than its horizontal. Such a duct is shown in Figure 2 in which the duct is defined by top 19, bottom 20 and sides 21 and 22. It is also preferred that the top 19 be located as near the ceiling 6 as practical and that the cross sectional area be gradually decreased from adjacent the connection with air chilling device 11 rearwardly to end 18, whereby constant pressure is maintained throughout the entire length thereof to provide for a uniform flow of chilled air therefrom. The air duct 17 is provided with a plurality of louvers or outlets 23 in each of the compartments, except the rear compartment 14. As the conduit 17 terminates in this compartment no louvers are necessary and the end 18 can be left open instead. The duct 17 is also provided with the dampers, such as 24 and 24' located adjacent to the partitions 15 and 16, respectively, separating the compartments one from another.

As shown in Figure 2, the operation of the dampers 24 is controlled from outside of the truck. Preferably the dampers will be operated from below the floor of the trailer body as shown in order to be readily reached by the operator. A suitable construction is one in which the damper 24 is mounted upon a rod 25 extending vertically through the air duct 17 as at 26 and 27, and downwardly along the wall 4 through the floor 7, as at 28. The rod 25 may be suitably supported as by a pin 29 above the top 19 of the air duct and by a collar 30 above and immediately adjacent to the floor 7. A crank 31 rigidly affixed to the lower end of the damper rod 25 outside of the trailer enables the operator to readily control the location of the damper 24 without opening the body. In order to protect the damper rod 25 from damage due to objects loaded within the body bumping against it, and to permit its operation at all times, I prefer that the damper rod 25 be protected by a pipe 32 extending from immediately adjacent the bottom 20 of the air duct to the floor 7 of the body, as shown. The protective pipe 32 may be affixed to the body wall by any suitable means, as staples 33.

The construction of the partitions, such as 15 and 16, dividing the trailer body into the respective compartments, is best shown in Figure 3. A pair of heavy curtains, such as 34 and 35, and 34' and 35', respectively, which may be of duck or other suitable material, are suspended by rings 36 threaded over a bar 37 which is affixed to the body as close to the ceiling 6 as possible. The sides of the curtains 38 and 39 adjacent the respective side walls 4 and 5 are tightly affixed thereto as by means of a strip 40 nailed to the respective walls as by nails 41. The curtains should be sufficiently wide to give considerable overlap as at 42 and 42' in Figure 1 when they are drawn together. Also, the curtains should be considerably longer than the height of the body in order to permit a relatively long portion 43 and 43' to lie flat upon the floor 7 and thus form an air-tight seal along the floor of the body.

The air chilling unit 11 comprises a central ice bunker or compartment 44, defined by end walls 45 and 46, side walls 47 and 48, bottom 49, and top 50. The bunker should be constructed of suitable, strong, waterproof material, such as sheet metal. The bottom preferably will be braced by a plurality of braces, such as angle irons 51, in order to prevent the bottom from buckling when loaded with ice. A hopper 52 is located in the top 50 of the ice compartment, fitting into or located directly under the hatch 53 in the top 6 of the trailer body, whereby a charge of crushed ice 55 can be loaded into the ice bunker 44 from outside of the trailer body. The hatch is then closed by tightly fitting cover 54. The bottom 49 should be constructed either of foraminous material or be provided with a narrow slit 56 extending substantially across it in order to permit the water to drain from the bunker. The slit 56 is preferred to foraminous material in order to form a sheet of brine falling from the ice compartment 44, for the reasons hereafter mentioned. A header pipe 57 located within the ice bunker 44 adjacent the top 50 partially encircles the bunker. The header pipe 57 is provided with a plurality of sprays 58 whereby brine 59 may be sprayed upon the charge of ice 55 and salt. The brine, after passing over the ice 55 becomes chilled and drains through the slit 56.

The ice bunker 44 is partially enclosed within an outer compartment 60, the side walls of which may be the side walls 47 and 48 of the ice bunker suitably extended. The outer compartment 60 is further defined by the end walls 61 and 62, and bottom 63. The bottom 63 of this outer compartment must be watertight as the lower portion thereof serves as a brine storage tank 64 for the brine draining from ice bunker 44. As will be seen in Figure 3, the outer compartment forms a series of connected air passages such as the vertical passage 65 between end walls 46 and 62, a horizontal passage 66 below the ice bunker 44, and above the brine 59, in brine storage portion 64, and a second vertical passage 67 partially defined by end walls 45 and 61 and leading into air duct 17. This air chilling device consisting of the ice bunker 44 and the outer air compartment 60 is supported by suitable supports or legs such as 68, 69 and 70, resting upon the floor of the truck.

Over the upper, or intake, end of air passage 75 is placed a suitable fan, such as a "Sirocco" blower 71, the shaft 72 of which is journaled in suitable bearing 73 mounted upon the compartment in any suitable manner, such as at 74. The shaft 72 should extend through the front end wall 2 of the trailer body, as at 75. The outer end of the shaft is provided with a suitable pulley 76 which can be driven by any suitable means, such as a small gasoline engine 77, mounted on the outside of the front end of the trailer and connected to pulley 76 by belt 78. Preferably, the opposite end of the saft 72 will be provided with a pulley 79 rigidly mounted thereon. It is understood that the engine 77 may be operated by automatic means controlled by a thermostat, not shown, within the body 1. Such controls are well known in the art.

Adjacent the upper end of the air passage 65 is a header pipe 80 provided with a plurality of sprays 81. I prefer that the header 80 be connected to the header 57 in the ice bunker, such as by pipe 82, and also be connected to a brine supply pipe 83 on the outside of the compartment. Preferably the sprays 81 will point downwardly so that the brine sprayed therefrom will not get into the fan 71, but will fall into the brine storage basin 64.

Preferably the air passages 65 and 66 will be of relatively large cross section so that the air will pass relatively slowly therethrough in order to secure the maximum cooling effect from the brine sprayed from the sprays 81 and falling in a sheet through the slit 56 in the bottom of the ice bunker and from the chilled end wall 46 and bottom 49 of the bunker. I have found that better cooling is secured by permitting the brine to fall in a sheet as from slit 56 than by permitting it to fall indiscriminately, as from perforated material. I prefer that the air passage 67 be of considerably reduced cross section so as to increase the speed of the air as it passes therethrough. I have found that previous air chilling devices have been unsatisfactory insofar as moisture was carried to the air duct or air outlet. I am able to avoid this defect by decreasing the cross-sectional area of this air passage 67, thereby increasing the speed of the air as it passes therethrough, and forcing the air to make a sharp right angle turn as it passes around the corner formed by the bottom 49 and end wall 45 of the ice bunker. This type of construction causes the major portion of the moisture contained in the air to be impinged upon the end wall 61 of the air compartment and to drain backwardly into the brine tank.

I am able to further remove entrained water from the air before it passes into the compartments of the truck by providing that air duct 17 is of considerably smaller cross-sectional area than air passage 67, and by connecting the air duct 17 with the air passage 67 by a right angle turn on the inside corner as at 84, and by providing that the top 85 of the air passage 67 be curved, as shown at 86. This construction will take practically all of the free moisture out of the air before it passes into the air duct 17. In order to prevent still further the ejection of moisture from the louvers 23 of air duct 17, I have used a duct as previously described, in which the bottom 20 slopes downwardly from the open end 18 to the air chilling unit 11, so that any further moisture condensing or depositing upon the inside of the duct will drain back into the air chilling unit. As shown in Figure 3, it is preferred that the louvers 23 be only partially as high as the air duct so that moisture will not flow from them as it passes down the duct.

The bottom 63 of the outer compartment 60 is provided with a sump 87. The sump is connected to a drain 88 which leads downwardly through the floor 7, as at 89, and is provided, preferably outside the body, with a valve 90 to control the draining of the brine from the brine storage tank 64. The sump 87 is also provided with a suitable intake pipe 91 leading from the sump 87 to a pump hereinafter described. Preferably the open end of the intake pipe 91 will be protected by a screen 92 to prevent debris which collects in the brine from passing through the pipe 91 into the pump.

A brine pump 93 is mounted upon a suitable support, such as 94, rigidly affixed to the end 62 of the outer compartment, intermediate the sump 87 and the blower 71. The pump 93 is driven by a shaft 95 which is mounted in a suitable bearing such as 96 suitably attached to support 94, and is provided with a pulley 97. A belt 98 connects the pulley 97 with pulley 79 of the blower shaft, so that the operation of the engine 77 operates both the blower 71 and the pump 93. The outlet of the pump 93 is connected to the brine supply pipe 83, preferably by means of a rubber hose 99, whereby vibration of the pump will not be carried into the header pipes 57 and 58.

In order to provide a self-priming pump, I prefer that the pump 93 be so placed that the intake is horizontal and the outlet is vertical, and that the connection with the brine sump forms an inverted U above the level of the pump. This connection can be secured by means of a pipe 100 connected to the brine intake pipe 91 and leading upwardly along the end 62 of the outer compartment from the sump to a position above that of pump 93. In order to avoid transmitting of vibration from the pump 93 to the sump connection, I place a hose connection 101 in the pipe 100, although it may be located at any place in this piping from the sump to the pump. The upper end of pipe 100 is provided with an elbow 102 to which is joined a short, horizontal pipe 103. The opposite end of the horizontal pipe 103 is provided with a T 104, the stem of which is threaded on pipe 103 and the upper end of which is closed by a plug 105. The lower branch of the T 104 connects to a pipe 106 running downwardly to the level of the pump 93. A second elbow 107 connects pipe 106 to the pump inlet 108. By means of the connection above shown, sufficient brine will be retained in the piping to provide for priming the pump when operation is started.

It is believed that the operation of the present invention will be readily understood. Assuming that the trailer 1 is empty and it is desired to load it with perishable product for transportation, the doors 9 and 10 would be closed, the ice bunker 44 loaded with crushed ice and salt through hopper 52, and the engine 77 started. The operation of the engine forces air through the system into all parts of the body 1. It also pumps brine to the sprays 58 and 61. Brine from the sprays 58 falls upon the ice, melting the ice and chilling the brine, which then flows through the slit 56 into the outer compartment 60. Recirculation of the brine keeps it chilled and thereby furnishes the sprays 61 in the air passage 65 with chilled brine, which greatly facilitates the chilling of the air passing therethrough. Also, the brine draining from the ice compartment 44 in the form of a sheet is superior to permitting it to fall through scattered perforations, as it requires that all of the air passing therethrough be subjected to such chilled brine. The circulation of such super-chilled air will rapidly decrease the temperature in the body.

When the truck is to be loaded, the dampers 24 and 24' will be closed, the doors opened, and product to be last unloaded is first loaded into compartment 12. When this compartment is loaded, the curtains 34 and 35, forming the partition 15, are drawn, so that they overlap, as at 42, and the lower end lies on the floor, as at 43. Compartment 13 is then loaded with product which will be unloaded intermediate the first and last unloading. When this compartment is properly loaded the curtains 34' and 35' comprising partition 16 are drawn so that they overlap as at 42', and the lower portion is lying upon the floor as at 43'. Damper 24 is then opened, while 24' is closed so that air from the air chilling unit 11 can flow into both compartments 12 and 13, but not into compartment 14. Thereupon, compartment 14 is loaded with product to be first removed, and when this compartment is filled the doors are closed and damper 24' is opened so that chilled air may flow into this compartment as well as compartments 12 and 13.

By the means herein disclosed, it is evident that the compartments are effectively sealed, one from another, except at the very top of the curtain. In actual practice it has been found that a small space is necessary between the curtain and the roof of the trailer in order to permit air to return from the rear compartment 14 to the air chilling unit 11. However, this space is sufficiently small that there is small loss of chilled air from an adjacent compartment, such as 13, when the one behind it, as 14, is opened to the outer atmosphere and when the doors 9 and 10 are opened. Clearly, the chilled air as it issues from the duct 17 will tend to remain at the floor and only warmer air can pass over the top of the curtain. It has been found in actual practice that when the trailer is opened so that compartment 14 is opened to the outer atmosphere, the temperature in that compartment will rapidly rise as much as thirty degrees. However, with the means herein disclosed the temperature in the adjacent compartment, such as 13, will remain relatively constant and actual tests show difference in temperatures between two adjacent compartments as great as thirty degrees Fahrenheit. Thus product in compartments other than the one opened to the outside air uniformly maintains the desired refrigeration temperatures in spite of the great fluctuation in the opened compartment.

In the unloading of the truck, the driver, before making the first delivery, will close the damper 24' so as to prevent the charging of chilled air into the rear compartment 14, will then open the doors 9 and 10 and deliver such product as may be necessary, often making a large number of stops before compartment 14 will be completely unloaded. In the meantime, however, compartments 12 and 13 are substantially sealed from the outer atmosphere which has entered the rear compartment 14, and chilled air is being charged into these compartments. After compartment 14 is completely unloaded, the driver will close damper 24, open the curtains 34' and 35', and unload the product in compartment 13 without affecting the temperature in compartment 12. When compartment 13 is completely unloaded, the first compartment, 12, can be opened and unloaded.

It has been found in actual practice that not only is the temperature constantly maintained in the unopened compartments, but that the means of refrigeration herein disclosed is more economical than heretofore known. This is due to the fact that the refrigeration unit is not forced to supply chilled air to the entire truck body, the air of which has been warmed by opening the rear doors. Heretofore the opening of the doors for the first stop permitted the outflowing of practically all of the chilled air within the truck and the inflow of warm outside air. This of course rapidly melted the ice as the refrigeration unit would be operating to reduce the temperature within the trailer. This wastage of refrigeration is no longer necessary with the means herein described.

Manifestly, many modifications and variations of the invention hereinbefore set forth may be made by persons skilled in the art without departing from the spirit and scope hereof. Accordingly, the appended claims are to be given an interpretation commensurate with the novelty herein described and as broad as may be permitted by prior art.

I claim:

1. In a refrigerated vehicle, one or more curtains substantially impervious to the passage of air therethrough for dividing said vehicle into a plurality of transverse sections, means for slidably suspending said curtains from the ceiling thereof, and means for fastening the outer edges of said curtains to the walls of said body, said curtains being of a length sufficient to permit a substantial portion to lie upon the floor.

2. In a refrigerated vehicle, one or more curtains substantially impervious to the passage of air therethrough for dividing said vehicle into a plurality of transverse sections, means for slidably suspending said curtains from immediately adjacent to the ceiling thereof, means for fastening the outer edges of said curtains to the walls of said body, said curtains being of a length sufficient to permit a substantial portion to lie upon the floor, an air chilling means within said vehicle, means for conducting air from said air chilling means to said transverse sections, and a valve means for controlling the discharge of air from said conducting means into said sections.

3. In a refrigerated vehicle having an enclosed freight carrying body, at least one curtain disposed transversely the vehicle for dividing the body into a plurality of compartments, said curtain being substantially impervious to the passage of air therethrough, said curtain being removably suspended across the ceiling of said vehicle and in engagement with the side walls thereof, said curtain being of a length sufficient to permit a substantial portion to lie upon the floor whereby to seal each of said compartments against the circulation of cold air across the bottom of the body.

4. In a refrigerated vehicle having an enclosed freight carrying body, at least one curtain disposed transversely the vehicle for dividing the body into a plurality of compartments, said curtain being substantially impervious to the passage of air therethrough, said curtain being removably suspended across the ceiling of said vehicle and in engagement with the side walls thereof, said curtain being of a length sufficient to permit a substantial portion to lie upon the floor whereby to seal each of said compartments against the circulation of cold air across the bottom of the body, and air chilling means within said vehicle, means for conducting air from said chilling means to said transverse sections, and valve means for controlling the discharge of air from said conducting means into said sections.

5. In a refrigerated vehicle having a body for receiving freight, a plurality of transverse sections, an air duct to deliver air to said sections, means to cool said air, said means including water cooling means and spray means to direct the cooled water into the air stream, said duct comprising a passage having louvers of less length than the height of the duct, said louvers being spaced from the bottom of said passage to provide a trough to carry away any water that may be deposited on the walls of the passage after being carried from the spray into the duct by the air stream.

6. In a refrigerated vehicle having a body for receiving freight, a plurality of transverse sections, an air duct to deliver air to said sections, means to cool said air, said means including water cooling means and spray means to direct the cooled water into the air stream, said duct comprising a passage sloping toward said spray means and having louvers of less length than the height of the duct, said louvers being spaced from the bottom of said passage to provide a trough to carry away any water that may be deposited on the walls of the passage after being carried from the spray into the duct by the air stream.

7. A method of refrigerating a vehicle body divided into a series of compartments of which the end compartment can be entered only from the exterior of the truck and each of the rest of the compartments can be entered only from the preceding compartment of the series, said method comprising delivering a supply of refrigerated air into said compartments, then discontinuing the supply of air to said end compartment before opening it to the atmosphere to permit unloading thereof and subsequently discontinuing the supply of air in turn to each compartment which has become the end compartment of the refrigerated series by the opening of the preceding compartment and before such end compartment is opened for entry for unloading the same.

8. A method of refrigerating a vehicle body divided into a series of compartments of which the end compartment can be entered only from the exterior of the truck and each of the rest of the compartments can be entered only from the preceding compartment of the series, said method comprising delivering a supply of refrigerated air from a common source into said compartments, then discontinuing the supply of air to said end compartment before opening it to the atmosphere to permit unloading thereof and subsequently discontinuing the supply of air in turn to each compartment which has become the end compartment of the refrigerated series by the opening of the preceding compartment and before such end compartment is opened for entry for unloading the same.

ERIC W. LAGER.